US012688345B2

(12) United States Patent
Wang et al.

(10) Patent No.: US 12,688,345 B2
(45) Date of Patent: Jul. 21, 2026

(54) LINE DIAGNOSIS METHOD AND APPARATUS

(71) Applicant: Lenovo (Beijing) Limited, Beijing (CN)

(72) Inventors: Jun Wang, Beijing (CN); Zhijie Li, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 1116 days.

(21) Appl. No.: 17/685,895

(22) Filed: Mar. 3, 2022

(65) Prior Publication Data

US 2023/0078086 A1 Mar. 16, 2023

(30) Foreign Application Priority Data

Sep. 14, 2021 (CN) .......................... 202111073694.8

(51) Int. Cl.
*G06F 30/3308* (2020.01)
*G06F 30/20* (2020.01)
*G06F 30/343* (2020.01)
*G06F 113/02* (2020.01)
*G06F 119/02* (2020.01)

(52) U.S. Cl.
CPC .......... *G06F 30/3308* (2020.01); *G06F 30/20* (2020.01); *G06F 30/343* (2020.01); *G06F 2113/02* (2020.01); *G06F 2119/02* (2020.01)

(58) Field of Classification Search
CPC ..... G06F 30/3308; G06F 30/20; G06F 30/343
USPC .......................................................... 703/15
See application file for complete search history.

(56) References Cited

U.S. PATENT DOCUMENTS

| | | | | |
|---|---|---|---|---|
| 5,717,846 A * | 2/1998 | Iida | .......................... | G06F 30/18 |
| | | | | 345/474 |
| 6,708,322 B2 * | 3/2004 | Ito | ........................... | G06F 30/30 |
| | | | | 716/108 |
| 7,154,278 B2 * | 12/2006 | Scholl | .................... | G01R 31/52 |
| | | | | 324/510 |
| 7,913,002 B2 * | 3/2011 | Washizu | ............... | G06F 11/273 |
| | | | | 714/724 |
| 8,049,510 B2 * | 11/2011 | Queck | ............... | H04L 12/40006 |
| | | | | 324/522 |
| 9,727,668 B2 * | 8/2017 | Kakkar | .................... | G06F 30/20 |
| 10,635,843 B2 * | 4/2020 | Garg | ...................... | G06F 30/20 |
| 2002/0013635 A1 * | 1/2002 | Gotou | ................. | G01M 13/045 |
| | | | | 702/182 |
| 2002/0194547 A1 * | 12/2002 | Christensen | .......... | H04L 12/423 |
| | | | | 714/E11.026 |

(Continued)

FOREIGN PATENT DOCUMENTS

| | | | | |
|---|---|---|---|---|
| CN | 103401728 | * 11/2013 | ............ | H04L 49/111 |
| CN | 103401728 A | 11/2013 | | |
| CN | 107423179 A | 12/2017 | | |

*Primary Examiner* — Iftekhar A Khan
(74) *Attorney, Agent, or Firm* — ANOVA LAW GROUP, PLLC

(57) ABSTRACT

A line diagnosis method includes, in a situation that a first interface of a first device is connected to a second interface of a second device, obtaining first interface information of the first interface and second interface information of the second interface, and diagnosing a line connection between the first device and the second device based on the first interface information and the second interface information.

14 Claims, 4 Drawing Sheets

Acquisition circuit — 201

Diagnosis circuit — 202

(56)  References Cited

U.S. PATENT DOCUMENTS

| | | | | |
|---|---|---|---|---|
| 2005/0055189 | A1* | 3/2005 | Nakamura | G06F 30/20 |
| | | | | 703/14 |
| 2005/0256662 | A1* | 11/2005 | Alder | G01R 31/2834 |
| | | | | 702/119 |
| 2009/0183033 | A1* | 7/2009 | Ando | H04L 43/0823 |
| | | | | 714/43 |
| 2012/0136599 | A1* | 5/2012 | Inui | G06F 30/367 |
| | | | | 702/65 |
| 2012/0331437 | A1* | 12/2012 | Pai | G06F 30/398 |
| | | | | 716/136 |
| 2013/0049767 | A1* | 2/2013 | King | G01R 31/58 |
| | | | | 324/605 |
| 2014/0005881 | A1* | 1/2014 | Hardesty | G07C 5/0808 |
| | | | | 701/32.8 |
| 2015/0177322 | A1* | 6/2015 | Yoshinaga | G01R 31/3177 |
| | | | | 714/736 |
| 2015/0346259 | A1* | 12/2015 | Jiang | H04L 12/40006 |
| | | | | 324/538 |
| 2015/0347645 | A1* | 12/2015 | Carlin | G06F 30/3308 |
| | | | | 716/102 |
| 2016/0178683 | A1* | 6/2016 | Ramey | G01R 31/52 |
| | | | | 324/537 |
| 2018/0067159 | A1* | 3/2018 | Ramey | G01R 31/008 |
| 2018/0276321 | A1* | 9/2018 | Angelico | G01R 31/58 |

* cited by examiner

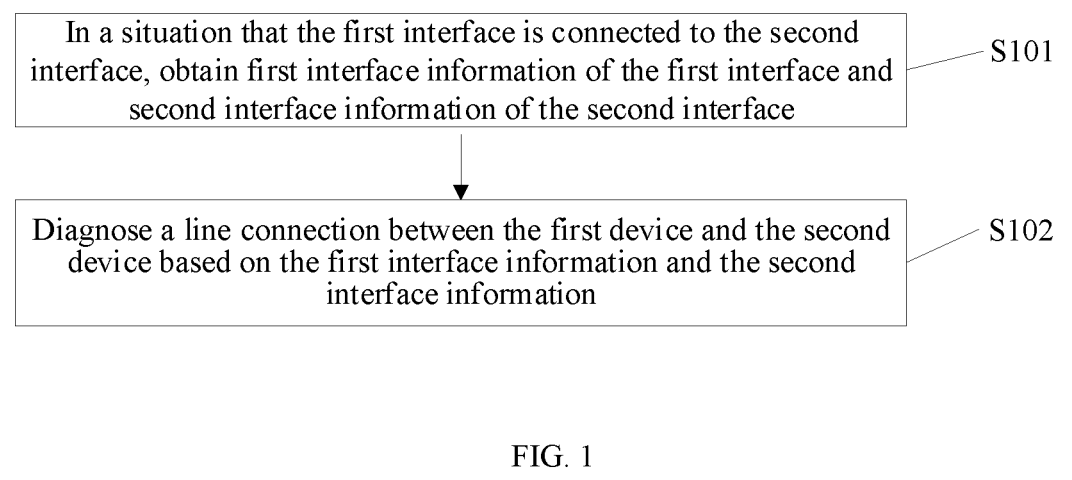

In a situation that the first interface is connected to the second interface, obtain first interface information of the first interface and second interface information of the second interface — S101

Diagnose a line connection between the first device and the second device based on the first interface information and the second interface information — S102

FIG. 1

LINE DIAGNOSIS METHOD AND APPARATUS

CROSS-REFERENCE TO RELATED APPLICATION

This application claims priority to Chinese Patent Application No. 202111073694.8, filed on Sep. 14, 2021, the content of which is incorporated herein by reference in its entirety.

TECHNICAL FIELD

The present disclosure generally relates to the field of line diagnosis and, more particularly, to a line diagnosis method and apparatus.

BACKGROUND

As complexity of a system configuration increases, a line layout of the system becomes more and more complicated.

For example, there are more than 100 kinds of cables in an existing 2U server. At present, it is only possible to manually check whether a cable assembly is correct according to an existing line diagram, which is inefficient and prone to errors.

SUMMARY

In accordance with the disclosure, there is provided a line diagnosis method including, in a situation that a first interface of a first device is connected to a second interface of a second device, obtaining first interface information of the first interface and second interface information of the second interface, and diagnosing a line connection between the first device and the second device based on the first interface information and the second interface information.

Also in accordance with the disclosure, there is provided a line diagnosis apparatus including a first device connected to a first interface that is configured to be connected to a second interface of a second device. The first device is configured to determine first interface information of the first interface; in a situation that the first interface is connected to the second interface, obtain second interface information of the second interface determined by the second device; and diagnose a line connection between the first device and the second device based on the first interface information and the second interface information.

Also in accordance with the disclosure, there is provided an apparatus including a processor and a computer-readable storage medium storing instructions that, when executed by the processor, cause the processor to, in a situation that a first interface of a first device is connected to a second interface of a second device, obtain first interface information of the first interface and second interface information of the second interface; and diagnose a line connection between the first device and the second device based on the first interface information and the second interface information.

BRIEF DESCRIPTION OF THE DRAWINGS

The following drawings are merely examples for illustrative purposes according to various disclosed embodiments and are not intended to limit the scope of the present disclosure. In the drawings, same or corresponding characteristic numerals represent same or corresponding parts.

FIG. 1 is a flow chart of an exemplary line diagnosis method consistent with the present disclosure.

DETAILED DESCRIPTION

Figure 2:
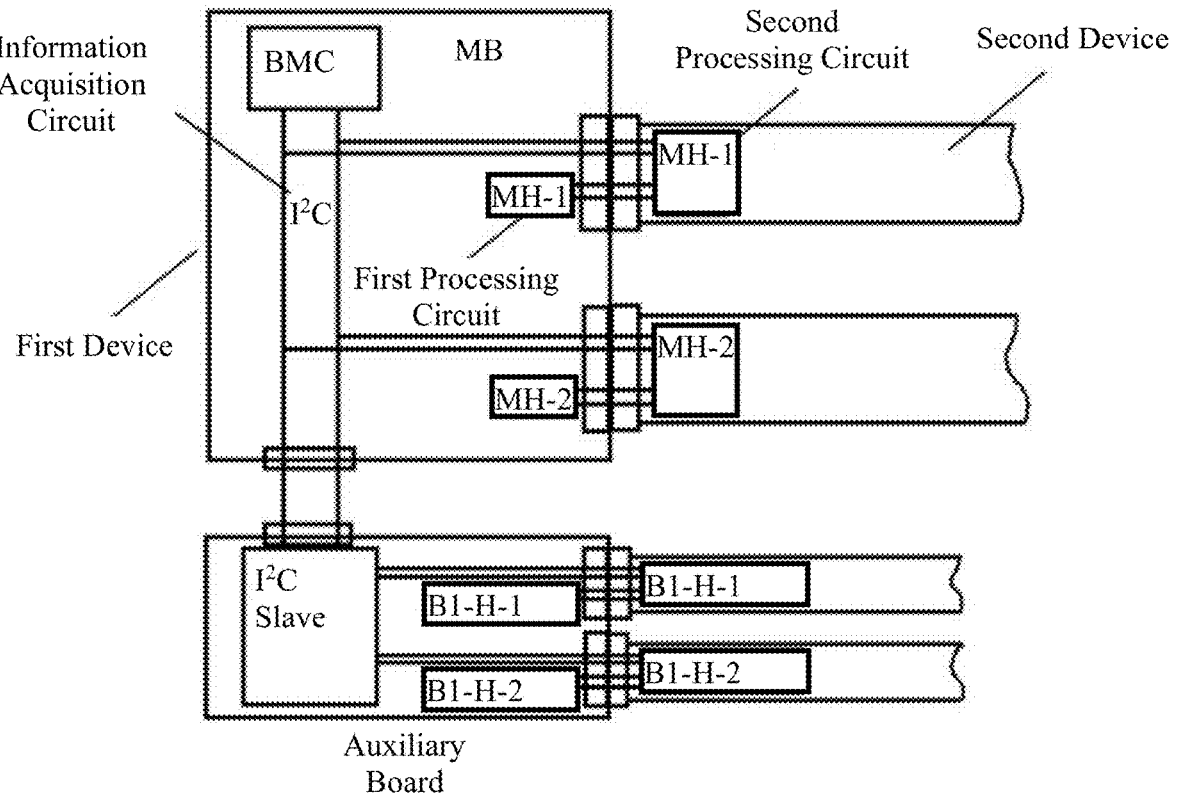
FIG. 2 is a schematic diagram showing a connection manner of a first device and a second device in an exemplary line diagnosis method consistent with the present disclosure.

Hereinafter, embodiments consistent with the disclosure will be described with reference to drawings. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

The present disclosure provides a line diagnosis method, applied to a first device and a second device. The first device may include a first interface and the second device may include a second interface. The method includes:

S101: in a situation that the first interface is connected to the second interface, obtaining first interface information of the first interface and second interface information of the second interface; and S102: diagnosing a line connection between the first device and the second device, according to the first interface information and the second interface information.

Each of the first device and the second device may be hardware of an apparatus, such as a motherboard, an FPGA board, a graphics card, a power supply, etc., or may be an apparatus such as a server host or a switch. Each of the first interface and the second interface may specifically include an IDE interface, an SCSI interface, a SATA interface, an MD device interface, a USB interface, a PCI interface, a serial interface, a VGA interface and so on.

In S101, the first interface of the first device and the second interface of the second device may be directly connected or connected through a cable. In the case of connection, the first interface information of the first interface and the second interface information of the second interface may be obtained. The first interface information and the second interface information may specifically include the names of the corresponding devices, the interface names, the specific serial number of the cable, the interface number information, or the serial number information of each contact in the interface, and so on. The manner for acquiring the first interface information and the second interface information may specifically be acquiring by sending a relevant instruction through a baseboard management controller (BMC).

Further, in the case that the first interface and the second interface are not connected, the baseboard management controller may obtain one of the first interface information and the second interface information by sending relevant instructions.

In S102, after the first interface information and the second interface information are acquired, it may be specifically determined based on a preset corresponding line diagram whether the interface information at interface connection in the line diagram has been acquired. When both the first interface information and the second interface information required by the interface connection are obtained, it may be determined that the interface connection is in the connected state. When one or both of the first interface information and the second interface information required by the interface connection are not obtained, it may mean that the interface connection is not in the connected state. Correspondingly, the line connection status of the first device and the second device may be diagnosed.

Therefore, by acquiring the first interface information of the first device and the second interface information of the second device, based on the first interface information and the second interface information, the line connection between the first device and the second device may be quickly and accurately diagnosed.

In one embodiment, acquiring the first interface information of the first interface and the second interface information of the second interface may include:

the first device determining the first interface information of the first interface and transmitting the first interface information to the second device; the second device determining the second interface information of the second interface and transmitting the second interface information and the received first interface information to the first device;

or, the first device determining the first interface information of the first interface; the second device determining the second interface information of the second interface and transmitting the second interface information to the first device.

In the present disclosure, the first interface information and the second interface information may be obtained through two manners described below.

In a first manner, as shown in FIG. 2, when the first interface and the second interface are connected, a first processing circuit (such as MH-1, MH-2, B1-H-1, or B1-H-2 in the figure) of the first device is connected to a second processing circuit (such as MH-1, MH-2, B1-H-1, or B1-H-2 in the figure) of the second device, and a base board management controller (BMC) of the first device is directly connected to the second processing circuit of the second device. During acquisition of the first interface information and the second interface information, the first interface information of the first interface may be acquired through the first processing circuit (such as MH-1, MH-2, etc. in the figure) of the first device and may be transmitted to the second processing circuit of the second device; the second processing circuit may obtain the first interface information sent by the first device while obtaining the second interface information; and then the second processing circuit may feed the first interface information and the second interface information in a preset format back to the base board management controller BMC.

In this implementation, when the first interface and the second interface are not connected, the base board management controller BMC may obtain neither of the first interface information and the second interface information.

Figure 3:
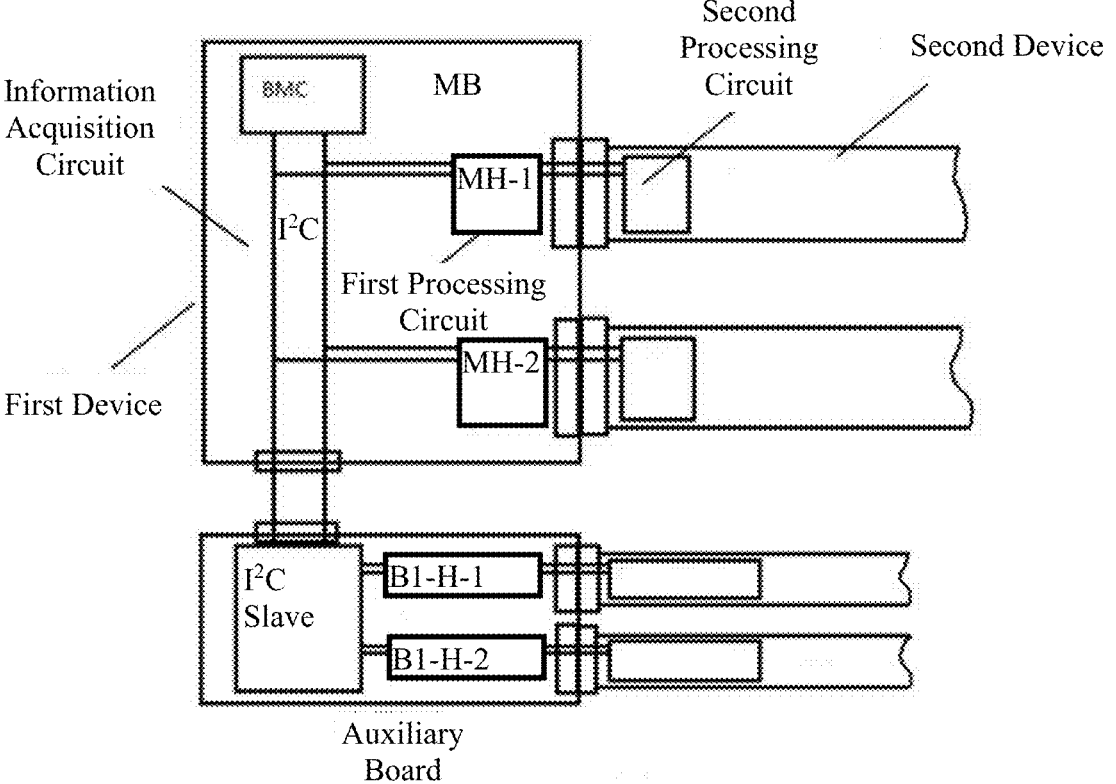
FIG. 3 is a schematic diagram showing another connection manner of a first device and a second device in an exemplary line diagnosis method consistent with the present disclosure.

In a second manner, as shown in FIG. 3, when the first interface and the second interface are connected, a first processing circuit (such as MH-1, MH-2, B1-H-1, or B1-H-2 in the figure) of the first device is connected to a second processing circuit (such as MH-1, MH-2, B1-H-1, or B1-H-2 in the figure) of the second device, and is connected to the base board management controller BMC. During acquisition of the first interface information and the second interface information, the first interface information of the first interface may be acquired through the first processing circuit (such as MH-1, MH-2, etc. in the figure) of the first device; the second processing circuit of the second device may obtain the second interface information of the second interface and send the second interface information to the first processing circuit;

and then the first processing circuit may send the first interface information and the second interface information in a preset format to the base board management controller BMC.

In this implementation, when the first interface and the second interface are not connected, the base board management controller BMC may still be able to obtain the first interface information but could not obtain the second interface information.

In one embodiment, based on the first interface information and the second interface information, diagnosing the line connection between the first device and the second device may include:

comparing the first interface information and the second interface information with preset line layout information; and based on the comparison result, diagnosing the line connection between the first device and the second device.

In one embodiment, the specific process of diagnosing the line connection between the first device and the second device in S102 may include:

obtaining the line layout information corresponding to the first device and the second device, where the line layout information may include interface information in each circuit and between the circuits, and so on; and comparing the interface information required between the circuits in each line layout information with the acquired interface information;

in response to the comparison result indicating that the required interface information matches the acquired interface information, determining that interfaces between corresponding devices are in a connected state; and in response to the comparison result indicating that the required interface information does not completely match, determining that interfaces between corresponding devices are in a disconnected state.

In one embodiment, the method may further include:

performing circuit connection simulation of the obtained first interface information and the second interface information on a preset circuit diagram to generate a line logic diagram.

In this embodiment, after the first interface information of the first device and the second interface information of the second device are obtained, the visual lines representing the electric circuits may be used to connect the first device and the second device when it is determined that the first device and the second device are in a connected state. The circuit logic diagram of the entire system may be formed after the connection status determination and visual line connection are completed for all circuits.

Another aspect of the present disclosure provides a line diagnosis apparatus. As shown in FIG. 2 and FIG. 3, the apparatus includes a first device.

The first device may be connected to a first interface, and may be used for determining the first interface information of the first interface. The first interface may be used for connecting to a second interface of a second device.

When the first interface and the second interface are connected, the first device may be further configured to acquire the second interface information determined by the second device.

The first device may be further configured to diagnose the line connection between the first device and the second device based on the first interface information and the second interface information.

In this embodiment, when in use, the first device and the second device may obtain the first interface information and second interface information, respectively, and the second device may send the obtained second interface information to the first device.

After acquiring the first interface information and the second interface information at the same time, the first device may diagnose the line connection between the current circuits based on the first interface information and the second interface information.

In one embodiment, the first device may include a first processing circuit and an information acquisition circuit.

The first processing circuit may be connected to the first interface, and may be used for determining the first interface information of the first interface.

The information acquisition circuit may be connected to the first processing circuit and/or the second device, and may be used for diagnosing the line connection between the first device and the second device based on the first interface information and the second interface information.

When the first processing circuit is connected to the information acquisition circuit, the first processing circuit may be further configured to acquire the second interface information determined by the second device, and transmit the first interface information and the second interface information to the information acquisition circuit.

In one embodiment, the information acquisition circuit may further specifically include a baseboard management controller BMC and an I²C bus. The information data may be transmitted through the I²C bus, and the baseboard management controller BMC and I²C bus may be integrated on a line motherboard (MB).

The first processing circuit may be connected to the information acquisition circuit and the second device in the following two manners.

In a first manner, as shown in FIG. 2, the first processing circuit is connected to the second device for acquiring the first interface information and sending the first interface information to the second device. The second device is also connected to the I²C bus of the first device, and is used for acquiring the second interface information and sending the first interface information and the second interface information to the I²C bus which are then transmitted to the baseboard management controller BMC.

In a second manner, as shown in FIG. 3, the first processing circuit is connected to the second device and the I²C bus. When operating, the second device acquires the second interface information of the second interface, and sends the second interface information to the first processing circuit. The first processing circuit is configured to acquire the first interface information and send the first interface information and the second interface information to the I²C bus which are then transmitted to the baseboard management controller BMC.

In addition to the main board (MB), as shown in FIG. 2 and FIG. 3, auxiliary boards, such as graphics cards, hard drives, etc., may also be configured based on the main board. Other boards may be connected to the I²C bus. Among the auxiliary boards, the same interface information acquisition method as the main board may be also used to acquire the first interface information on an auxiliary board and the second interface information of a connected circuit, and then the first interface information and the second interface information may be transmitted to the baseboard management controller BMC through the I²C bus.

In one embodiment, before transmitting the first interface information and the second interface information to the information acquisition circuit, the first processing circuit and/or the second device may be further specifically configured to set the first interface information and the second interface information in a unified format, to cooperate with the information acquisition circuit for identification processing.

In this embodiment, as shown in FIG. 2 and FIG. 3, before sending the first interface information and the second interface information to the baseboard management controller BMC, the information acquisition circuit or the second device may set the first interface information and the second interface information in a unified format, and then the first interface information and the second interface information in the unified format may be sent to the baseboard management controller BMC. The baseboard management controller BMC may identify the interface information through the preset format and perform corresponding processing.

The present disclosure also provides another line diagnosis apparatus. In one embodiment, the apparatus may include a second device.

The second device may be connected to a second interface, and may be used for determining second interface information of the second interface. The second interface may be used for connecting to a first interface of a first device, and the first device may be used for determining first interface information of the first interface.

When the first interface and the second interface are connected, the second device may be further configured to transmit the second interface information to the first device, to instruct the first device to diagnose line connection between the first device and the second device based on the first interface information and the second interface information.

Figure 4:
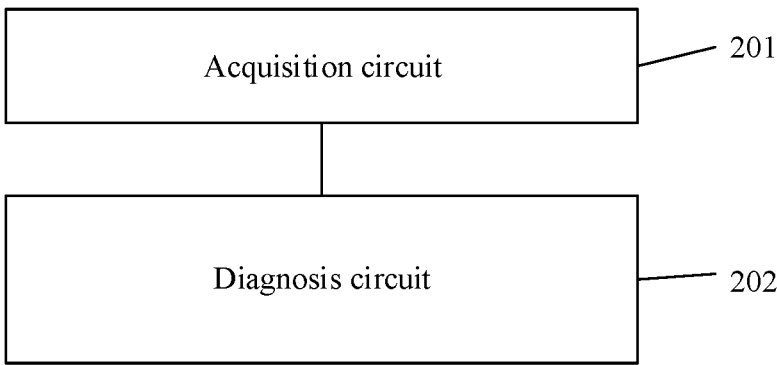
FIG. 4 is an exemplary line diagnosis apparatus consistent with the present disclosure.

The present disclosure also provides another line diagnosis apparatus for a first device and a second device. In one embodiment shown in FIG. 4, the first device includes a first interface, and the second device includes a second interface. The apparatus includes an acquisition circuit 201 configured to obtains first interface information of the first interface and second interface information of the second interface when the first interface is connected to the second interface; and a diagnosis circuit 202 configured to diagnose the line connection between the first device and the second device based on the first interface information and the second interface information.

In one embodiment, when being configured to obtain the first interface information of the first interface and the second interface information of the second interface, the acquisition circuit 201 may be specifically configured to:

determine the first interface information of the first interface through the first device, transmit the first interface information to the second device, determine the second interface information of the second interface through the second device, and transmit the second interface information and the received first interface information to the first device;

or, determine the first interface information of the first interface through the first device; determine the second interface information of the second interface through the second device, and send the second interface information to the first device.

In one embodiment, when being configured to diagnose the line connection between the first device and the second device based on the first interface information and the second interface information, the diagnosis circuit 202 may be specifically configured to:

compare the first interface information and the second interface information with preset line layout information; and based on the comparison result, diagnose the line connection between the first device and the second device.

In one embodiment, the diagnosis circuit 202 may be further also used to:

perform circuit connection simulation of the obtained first interface information and the second interface information on a preset circuit diagram to generate a line logic diagram.

The present invention also provides a computer-readable storage medium. The storage medium may contain a set of computer-executable instructions for performing any line diagnosis method provided by various embodiments of the present disclosure, when the instructions are executed.

In this embodiment of the present disclosure, the computer-readable storage medium may include a set of computer-executable instructions, which, when being executed, are used to obtain the first interface information and the first interface information of the first interface when the first interface is connected to the second interface; and, based on the first interface information and the second interface information, diagnose the line connection between the first device and the second device.

The present disclosure further provides an apparatus including a processor and a computer-readable storage medium storing a set of computer-executable instructions that, when executed by the processor, causes the processor to perform line diagnosis method consistent with the disclosure, such as any of the above-described example methods.

In the present disclosure, description with reference to the terms "one embodiment," "some embodiments," "example," "specific example," or "some examples," etc., mean specific features, structures, materials, or characters described in connection with the embodiment or example are included in at least one embodiment or example of the present disclosure. Furthermore, the particular features, structures, materials or characteristics described may be combined in any suitable manner in any one or more embodiments or examples. Furthermore, those skilled in the art may combine the different embodiments or examples described in this specification, as well as the features of the different embodiments or examples, as long as they do not conflict with each other.

In the present disclosure, the terms "first" and "second" are only used for descriptive purposes, and should not be understood as indicating or implying relative importance or implying the number of indicated technical features. Thus, a feature associated with "first," "second" may expressly or implicitly include at least one of that feature. In the description of the present disclosure, "plurality" means two or more, unless otherwise expressly and specifically defined.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure.

What is claimed is:

1. A line diagnosis method comprising:

in a situation that a first interface of a first device is connected to a second interface of a second device, obtaining first interface information of the first interface and second interface information of the second interface, at least one of the first interface information or the second interface information being transmitted over a bus, each of the first interface information and the second interface information including interface number information or serial number information of each contact corresponding to a respective interface of the first interface and the second interface, wherein the obtaining the first interface information and the second interface information comprises transmitting an instruction through a controller coupled to the bus and receiving, at the controller via the bus, at least one of the first interface information or the second interface information; and diagnosing a line connection between the first device and the second device based on a comparison of the first interface information and the second interface information to preset line layout information.

2. The method according to claim 1, wherein obtaining the first interface information of the first interface and the second interface information of the second interface includes:

determining the first interface information of the first interface through the first device;

transmitting the first interface information to the second device; and receiving the second interface information and the first interface information from the second device, the second interface information being determined through the second device.

3. The method according to claim 1, wherein obtaining the first interface information of the first interface and the second interface information of the second interface includes:

determining the first interface information of the first interface through the first device; and receiving the second interface information from the second device, the second interface information being determined through the second device.

4. The method according to claim 1, further comprising:

performing circuit connection simulation of the first interface information and the second interface information on a preset circuit diagram, to generate a line logic diagram.

5. A line diagnosis apparatus comprising:

a first device connected to a first interface and configured to:

determine first interface information of the first interface, the first interface being configured to be connected to a second interface of a second device, the first interface information including interface number information or serial number information of each contact corresponding to the first interface;

in a situation that the first interface is connected to the second interface, obtain, via a data bus, second interface information of the second interface determined by the second device, the second interface information including interface number information or serial number information of each contact corresponding to the second interface; and diagnose a line connection between the first device and the second device based on a comparison of the first interface information and the second interface information to preset line layout information, wherein the first device includes a processing circuit connected to the first interface and an information acquisition circuit, the information acquisition circuit includes the data bus and a management controller connected to the data bus, the data bus is connected to the processing circuit or the second device, and the management controller is configured to send an instruction to the processing circuit and the second device through the data bus, to instruct the processing circuit and the second device to obtain the first interface information and the second interface information, respectively.

6. The apparatus according to claim 5, wherein:

the processing circuit is configured to:

determine the first interface information of the first interface;

in a situation that the processing circuit is connected to the information acquisition circuit, obtain the second interface information determined by the second device and transmit the first interface information and the second interface information to the information acquisition circuit; and in a situation that the information acquisition circuit is connected to the second device, transmit the first interface information to the second device, to enable the second device to transmit the first interface information and the second interface information to the information acquisition circuit; and the information acquisition circuit is configured to diagnose the line connection between the first device and the second device based on the first interface information and the second interface information.

7. The apparatus according to claim 6, wherein the first interface information and the second interface information are set to a unified format before being transmitted to the information acquisition circuit.

8. The apparatus according to claim 6, wherein the management controller is further configured to diagnose the line connection between the first device and the second device based on the first interface information and the second interface information.

9. An apparatus comprising:

a processor; and a computer-readable storage medium storing instructions that, when executed by the processor, cause the processor to:

in a situation that a first interface of a first device is connected to a second interface of a second device, obtain first interface information of the first interface and second interface information of the second interface, at least one of the first interface information or the second interface information being transmitted over a bus, each of the first interface information and the second interface information including interface number information or serial number information of each contact corresponding to a respective interface of the first interface and the second interface, wherein the obtaining the first interface information and the second interface information comprises transmitting an instruction through a controller coupled to the bus and receiving, at the controller via the bus, at least one of the first interface information or the second interface information; and diagnose a line connection between the first device and the second device based on a comparison of the first interface information and the second interface information to preset line layout information.

10. The apparatus according to claim 9, wherein the instructions further cause the processor to, when obtaining the first interface information of the first interface and the second interface information of the second interface:

determine the first interface information of the first interface through the first device;

transmit the first interface information to the second device; and receive the second interface information and the first interface information from the second device, the second interface information being determined through the second device.

11. The apparatus according to claim 9, wherein the instructions further cause the processor to, when obtaining the first interface information of the first interface and the second interface information of the second interface:

determine the first interface information of the first interface through the first device; and receive the second interface information from the second device, the second interface information being determined through the second device.

12. The apparatus according to claim 9, wherein the instructions further cause the processor to:

performing circuit connection simulation of the first interface information and the second interface information on a preset circuit diagram, to generate a line logic diagram.

13. The method according to claim 1, wherein the diagnosing the line connection between the first device and the second device further comprises:

in response to both the first interface information and the second interface information matching a requirement indicated by the preset line layout information, determining that the first interface and the second interface are connected; and in response to at least one of the first interface information or the second interface information not matching the requirement indicated by the preset line layout information, determining that the first interface and the second interface are disconnected.

14. The method according to claim 4, wherein the generated line logic diagram includes a plurality of visual lines representing electric circuits to connect the first device and the second device when it is determined that the first device and the second device are in a connected state.

* * * * *